May 21, 1946.  J. B. PARSONS  2,400,572
REGULATOR MECHANISM UNIT
Filed Jan. 25, 1944  2 Sheets-Sheet 1
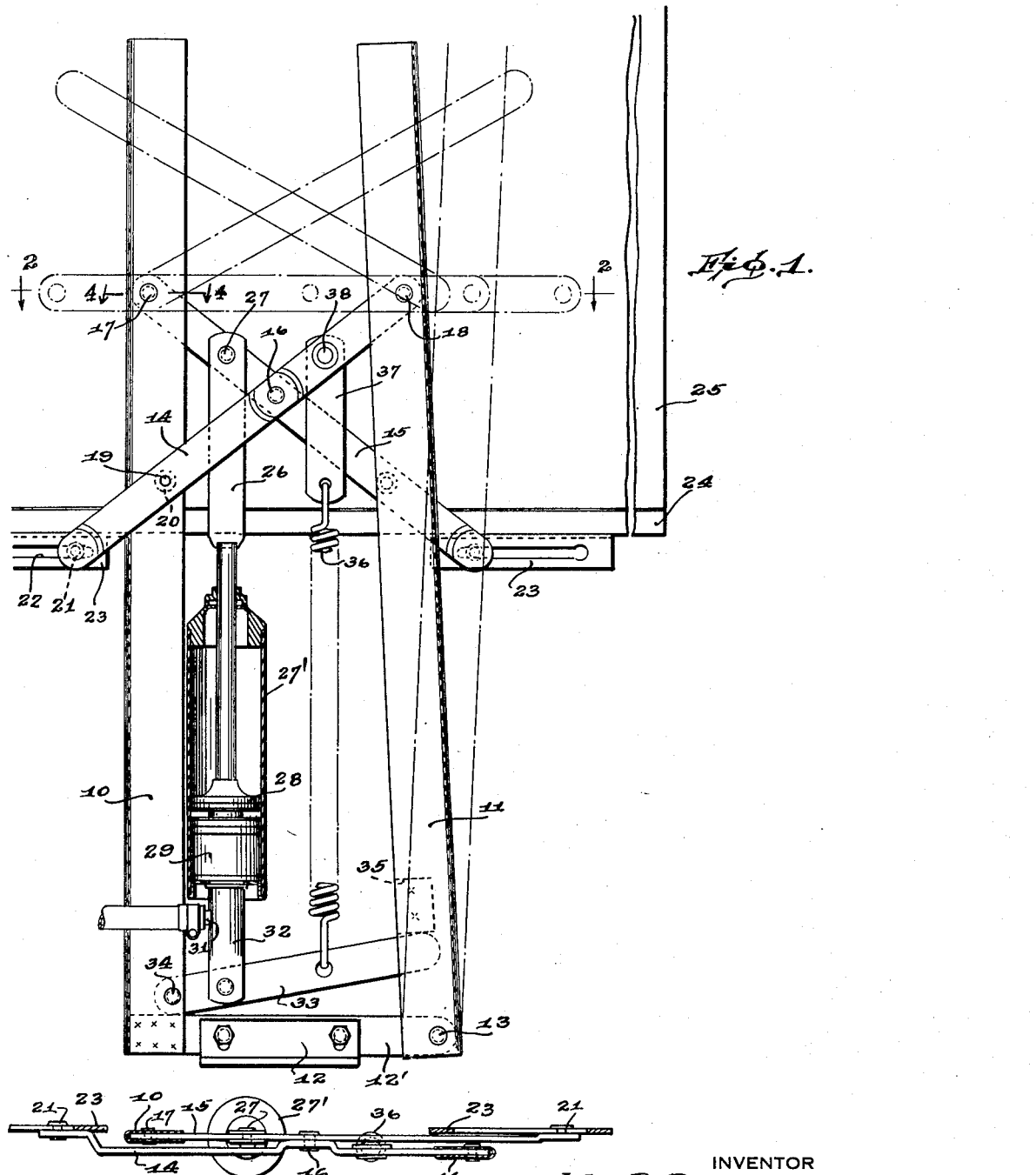
INVENTOR
John B. Parsons
BY
ATTORNEY May 21, 1946.    J. B. PARSONS    2,400,572
REGULATOR MECHANISM UNIT
Filed Jan. 25, 1944    2 Sheets-Sheet 2

INVENTOR.
John B. Parsons
BY
ATTY.

Patented May 21, 1946

2,400,572

UNITED STATES PATENT OFFICE 2,400,572

REGULATOR MECHANISM UNIT

John B. Parsons, Toledo, Ohio

Application January 25, 1944, Serial No. 519,617

9 Claims. (Cl. 268—124)

This invention relates to regulator mechanisms, such, for example, as mechanism for raising and lowering vehicle windows.

An object is to produce a simple and efficient regulator mechanism in the form of a unit which can, for example, be installed in the window well and connected to the window glass for actuating the same to and from closed position, the arrangement being such that installation can be readily and conveniently accomplished with a minimum of time and expense.

Another object is to produce a regulator mechanism of the cross arm type equipped with piston and cylinder assembly operatively connected to actuate the cross arms, the structure being self-contained and capable of being quickly and simply installed in position of use.

A still further object is to produce a regulator designed for the actuation of vehicle window panels which is self-contained and capable of being installed in the window well in a convenient manner, the mechanism including power actuating means such as an electric or hydraulic mechanism.

Other objects and advantages will hereinafter appear and for purposes of illustration but not of limitation, the invention is shown on the accompanying drawings in which Figure 1 is a side elevation partly in section of a regulator mechanism connected to operate a vehicle window glass and employing an hydraulic piston and cylinder assembly;

Figure 2 is a transverse sectional view substantially on the line 2—2 of Figure 1;

Figure 3:
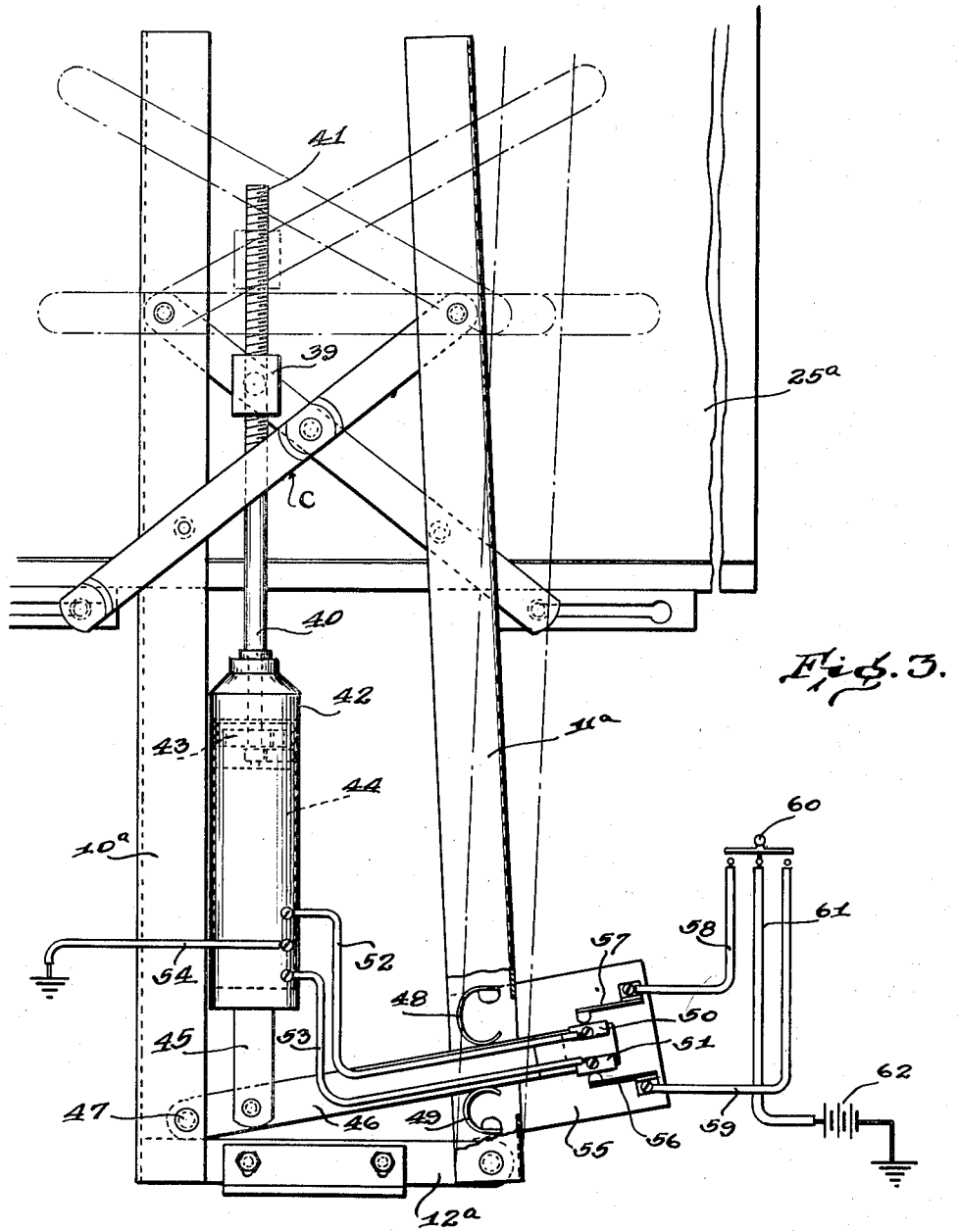
Figure 3 is a side elevation partly in section and partly diagrammatic, of a regulator mechanism for actuating a vehicle window glass and employing a reversible electric motor.
Figure 4:
Figure 4 is an enlarged transverse sectional view substantially on the line 4—4 of Figure 1.

The illustrated embodiment of the invention comprises a frame having upright side bars 10 and 11 which are connected at their lower ends by a cross bar 12' which is rigid with the side bar 10 and is pivotally connected by a rivet 13 to the side bar 11. As shown particularly in Figure 2, the side bars 10 and 11 are of channel shape, formed by folding a strip of metal upon itself and the cross bar 12' enters between the side walls on the channel shaped side bars. This enables relatively light gauge metal to be employed and thereby reduces the cost of the assembly. Fixed to the cross bar 12' by bolts passing through vertically elongate holes, is a bracket 12, providing a convenient mounting for the lower end of the assembly. The bracket 12 may be a part of the vehicle body structure, if desired. It will be apparent that the upper ends of the side bars 10 and 11 are free from each other.

A pair of cross arms 14 and 15 are pivotally connected intermediate their ends by a rivet 16, the region of the arm 14 receiving the rivet 16 being embossed so that the major portion of the cross arms are offset with respect to each other. The inner end of the cross arm 15 is connected by a rivet 17 to the side bar 10 and the corresponding end of the cross arm 14 is connected by a rivet 18 to the side bar 11. The inner ends of the cross arms are received between the sides of the channel shaped side bars which thus serve as guides for the swinging movement of the arms. It will be observed that the outer ends of the cross arms 14 and 15 overlap opposite sides of the side bars 10 and 11. Each of the outer end portions of the arms is provided with a button 19 which bears against the adjacent side bar. If desired, a ring of lubricant impregnated felt 20 may surround the button 19 to reduce the friction between the parts and facilitate the swinging movement of the arms.

Interposed between the sides of each of the U-shaped arms or side bars 10 and 11 in the region of the rivets 13, 17 and 18, is a spacer sleeve 17a through which each of these rivets pass. These spacer sleeves 17a insure that the parts such as the regulator arms 14 and 15 as well as the frame arm 11 can pivot freely. Thus when the rivets are inserted through these spacer sleeves and the end is upset, there is no liability of the sides of the arms being bent inwardly toward each other to frictionally engage these parts and interfere with their free pivotal movement. These spacer sleeves are found to be important in facilitating the assembly operations.

On the outer end of each of the arms 14 and 15 is a stud 21 fitting a horizontally elongate slot 22 formed in a retainer 23. The retainers 23 are fixed to and depend from a channel 24 which embraces the lower edge of the window glass 25. It will be manifest that during the swinging movement of the cross arms 14 and 15, the studs 21 slide along the slots 22 in the retainers.

For actuating the cross arms 14 and 15, a piston rod 26 is pivoted to the cross arm 15 by a rivet 27 intermediate the pivot pins 16 and 17. The piston rod 26 depends in a direction approximately parallel with the side bar 10 and extends into a cylinder 27'. Within the cylinder 27' and secured to the piston rod 26 is a piston 28. In fixed relation to the cylinder and arranged in the lower end thereof is a solenoid coil 29 which when energized, unseats a suitable spring tensioned valve member to admit pressure fluid through a fitting 31, the latter being connected by a suitable tube to a pump (not shown) for introducing liquid under pressure into the cylinder 27 for forcing the piston 28 upwardly. The liquid upon the return or downward movement of the piston 28 is forced from the cylinder and returns through the connections to a suitable reservoir. Detail description and illustration of the solenoid 29 and the spring tensioned valve member associated therewith are not given since the same forms no part of the present invention. However, reference is made to my Patent No. 2,279,243, dated April 7, 1942, which shows and describes a similar solenoid—valve assembly.

Secured to and depending from the cylinder 27' is a post 32 which is pivoted at its lower end to a bracket arm 33. The bracket arm extends between the sides of the side bar 10 and is pivoted to a rivet 34. The opposite end of the arm 33 engages between the channel sides of the side bar 11 and upward or counterclockwise movement of the arm 33 is limited by a stop 35 carried by the side bar 11. A coil spring 36 has one end connected to the arm 33 and the opposite end is connected to a link 37, the upper end of which is pivoted at 38 to the cross arm 14 between the pivot pins 16 and 18. The arrangement is such that the liquid trapped within the cylinder can expand and the expansion is resisted by the coil spring 36 upon downward rocking movement of the arm 33.

In the operation of the above described mechanism, it will be understood that upon energizing the solenoid 29 to unseat the valve associated therewith and admit liquid under pressure, the piston 28 is forced upwardly thereby swinging the cross arms 14 and 15 from the full line position shown in Figure 1 to the broken line position. During this movement, it will be manifest that the side arm 11 rocks about its pivot 13 toward and away from the bar 10 accommodating the relative positions of the side bars 10 and 11 to the movement of the cross arms. In this manner it will be manifest that the window glass 25 is moved from its lowermost to its uppermost position and also during such movement of the cross arms, the coil spring 36 is stretched or placed under tension so that when the solenoid 29 is again energized to unseat its valve for permitting the escape of liquid from the cylinder 27, the spring 36 functions to move the window glass 25 downwardly. In order to hold the window glass 25 in any desired position, the solenoid 29 may be de-energized and the valve closes thereby trapping the liquid within the cylinder and retaining the parts in the desired position of adjustment.

One important feature of the invention resides in the self-contained structure which can be readily and simply installed in position of use. All that is necessary is to position the unit within the window well and connect the bracket 12 in position and the mechanism is ready for operation. The tubing for the cylinder and wiring for the solenoid can extend through the well in an extremely simple fashion. In this manner the mounting of a window regulator mechanism is rendered extremely simple but it should be understood that the regulator can be used to advantage for other purposes such, for example, as adjusting the position of the driver's seat so that the invention is not limited to the use of the regulator mechanism to the actuation of vehicle windows.

In the embodiment of the invention shown on Figure 3, the frame is similar to that above described and has similar upright U-shaped side bars 10a and 11a, connected at their lower ends to a cross bar 12a, the bar 11a being pivotally connected to the cross bar in a similar manner. The cross arm regulator indicated generally at C is likewise similar to that above described. In this instance, instead of employing an hydraulic piston and cylinder assembly for actuating the cross arm regulator, a reversible electric motor is employed. As shown, a screw-threaded nut or sleeve 39 is pivotally connected to one of the cross arms of the regulator intermediate its pivotal connection with the adjacent side arm and the pivotal connection between the two cross arms. A vertically disposed rod 40 has a screw-threaded end portion 41 which threadedly engages the nut 39. The opposite end of the rod 40 extends inside of a cylindrical housing 42 and is operatively connected to gearing 43 disposed within the cylinder. The gearing may be of any suitable type but in this instance, is planetary gearing for reducing the speed of the armature of a reversible electric motor 44 so that the rod 40 is rotated at a speed somewhat less than the speed of the motor armature.

The cylinder 42 has a depending arm 45 at its lower end which is pivotally connected to a bracket arm 46 similar to the arm 33 above described, the arm 46 being pivoted at 47 to the side bar 10a. The opposite end portion of the arm is engaged by a pair of C-shaped springs 48 and 49 which are secured to the side bar 11a. As shown, the springs 48 and 49 engage respectively the upper and lower sides of the bracket arm 46 and normally hold the arm in a predetermined position. As shown, the bracket arm 46 projects outwardly beyond the side bar 11a and this projecting end portion is equipped with upper and lower contact members 50 and 51 respectively and are connected to the electric motor 44 by leads 52 and 53 respectively. The motor 44 is suitably grounded by a lead 54.

Fixed to the side arm 11a and projecting laterally therefrom, is a mounting plate 55. Secured to the plate 55 above and below the bracket arm 46 are spring contact members 56 and 57, the outer ends of which engage the contact pieces 50 and 51 respectively. A lead 58 extends from the contact arm 57 and a lead 59 extends from the contact arm 56, these leads terminating adjacent manual switch 60 from which extends a lead 61 to a battery 62 or other source of electric current. The arrangement is such that by rocking the switch 60 in one direction, the electric motor 44 is energized to rotate the shaft or rod 40 in one direction and actuation of the switch 60 in the opposite direction operates to drive the motor 44 and the rod 40 in the opposite direction. It will be apparent that upon rocking the switch 60 to the left or in a counterclockwise direction, current will flow from the battery 62 through the lead 61 through the switch to the lead 58, then through the contact arm 57 to the contact piece 50 and through the lead 52 to the motor 44 and of course, thence to ground through the lead 54.

Let us assume that in the latter position, the rod 40 is rotated in such manner as to swing the regulator arms C upwardly in order to raise the window 25a. In the event that the window encounters an excessive force or a force greater than that exerted by the spring 49, then the bracket arm 46 is rocked downwardly moving the contact part 50 away from the contact arm 57. In this manner the circuit is broken and the motor is stopped. Either the obstruction must be removed or further upward or raising movement of the window 25a can not be effected. It will then be necessary to actuate the switch 60 in the opposite direction to cause the downward movement of the window glass 25a. Thereupon, the bracket arm 46 will be restored to its predetermined position by the spring 49. It will be understood that upon downward movement of the window glass 25a the spring 48 may be depressed in the event an obstruction is encountered thereby breaking the circuit and stopping the motor 44. In this connection, it will be assumed that the switch 60 is swung in a clockwise direction so that the current passes from the battery 62 to the lead 61, thence to the switch 60, lead 59, contact arm 56, contact piece 51, lead 53 and from the motor through the ground lead 54.

From the above description, it will be manifest that the mechanism can be installed as a unit in the window well in the manner above described, and that in the event that a force in excess of a predetermined maximum is encountered, the motor will automatically stop, thereby militating against damage to the motor and associated parts.

This application constitutes a continuation in part of my application Serial No. 452,864, July 30, 1942, entitled Regulator mechanism unit.

It is to be understood that numerous changes in details of construction, arrangement and operation may be effected without departing from the spirit of the invention especially as defined in the appended claims.

What I claim is:

1. Regulator mechanism comprising a frame having a pair of laterally spaced side bars, a cross bar connecting the adjacent portions of said bars at one end, there being a pivotal connection between said cross bar and one side bar, the opposite end of one side bar being relatively movable toward and away from the other side bar, a pair of cross arms pivoted together intermediate their ends, pivotal connections between corresponding ends of said arms and said side bars, and means for swinging said arms whereby said pivotally mounted side bar rocks toward and away from the other side bar during the swinging of said cross arms from one extreme position to the other, said last means including a piston having a rod pivoted to one of the cross arms, a cylinder for said piston, a bracket arm for said cylinder pivoted at one end to one side bar, a stop on the other side bar for said bracket arm, and a coil spring connected to the other cross arm at one end and to said bracket arm at the other end.

2. A self-contained regulator unit for a window or the like movable between two positions of adjustment, said unit being adapted to be installed intact upon a suitable support and comprising a pair of laterally spaced side bars, a pair of pivotally connected arms, means for pivotally connecting said arms at one end thereof to said side bars, at least one of the other ends of said arms extending laterally beyond said side bars and provided with means for attachment to a window or the like, a bracket arm connected to one of said side bars and movable toward and away from said cross arms, motor means disposed wholly between said side bars and terminally connected to said bracket arm and to said pivotally connected arms for actuating said pivotally connected arms, and yieldable means resisting movement of said bracket arm away from said cross arms.

3. Regulator mechanism comprising a frame, having a pair of laterally spaced side bars, a cross bar connecting the adjacent portions of said bars at one end, there being a pivotal connection between said cross bar and one side bar, the opposite end of one side bar being relatively movable toward and away from the other side bar, a pair of pivotally connected cross arms, pivotal connections between corresponding ends of said arms and said side bars, means for swinging said arms whereby said pivotally mounted side bar rocks toward and away from the other side bar during the swinging of said cross arms from one extreme position to the other, power operated means mounted between said bars for actuating said cross arms, said power operated means including a reversible electric motor, a nut pivoted to one cross arm, a screw-threaded shaft engaging said nut and connected to be driven by said motor, and means to automatically reverse said motor in the event said regulator arms encounter an excessive resistance, and means for mounting said frame within a window well so that said cross bar is disposed innermost thereof and said opposite ends of the side bars disposed outermost.

4. Regulator mechanism as claimed in claim 3, comprising reduction gearing between the motor and rod, a bracket arm for the motor pivoted at one end to one side bar, spring means for yieldingly retaining said bracket arm in a predetermined position, contact members on opposite sides of said bracket arms electrically connected to said motor for driving same in one direction or the other, and resiliently mounted contact parts engageable respectively with said contact members, the arrangement being such that in the operation of the mechanism the motor is deenergized in the event said bracket arm moves in one direction or the other in response to a counteracting force in excess of said spring means.

5. Regulator mechanism as claimed in claim 3, comprising reduction gearing between the motor and rod, a housing for the motor and gearing, a bracket arm for the motor pivoted at one end to one side bar, a pivotal connection between said housing and an intermediate portion of said bracket arm, spring means for yieldingly retaining said bracket arm in a predetermined position, contact members on opposite sides of said bracket arms electrically connected to the motor for driving same in one direction or the other, and resiliently mounted contact parts engageable respectively with said contact members, the arrangement being such that in the operation of the mechanism, the motor is deenergized in the event said bracket arm moves in one direction or the other in response to a counteracting force in excess of said spring means.

6. Regulator mechanism as claimed in claim 3, comprising reduction gearing between the motor and rod, a bracket arm for the motor pivoted at one end to one side bar, spring means for yieldingly retaining said bracket arm in a predetermined position, said spring means including a spring on opposite sides of said bracket arm resisting rocking movement thereof in either direction, contact members on opposite sides of said bracket arms electrically connected to the motor for driving same in one direction or the other, and resiliently mounted contact parts engageable respectively with said contact members, the arrangement being such that in the operation of the mechanism the motor is deenergized in the event said bracket arm moves in one direction or the other in response to a counteracting force in excess of said spring means.

7. In a window or the like regulator mechanism, a substantially U-shaped frame comprising a pair of laterally spaced side bars and a cross bar connecting said side bars, said cross bar being rigidly affixed to one of said side bars, there being a pivotal connection between the other of said side bars and said cross bar whereby to allow said other side bar to pivot toward and away from said one side bar, a pair of pivotally connected arms, means pivotally connecting said arms at one end thereof to said side bars at points respectively remote from said cross bar, at least one of the other ends of said arms being provided with means for attachment to a window or the like element to be regulated, linear motor means drivingly connected to said arms for pivoting the latter with respect to one another and to said frame, and means pivotally mounting said motor means on said frame within the marginal confines thereof.

8. In a window or the like regulating mechanism, a substantially U-shaped frame comprising a pair of upstanding side bars and a cross bar connecting the lower ends thereof, said cross bar being rigidly affixed to one of said side bars, the other of said side bars being pivoted to said cross bar whereby to swing toward and away from said one side bar, a pair of arms, pivot means connecting corresponding ends of said arms and the upper portions of said side bars, said arms being pivoted to one another and being reversible between two extreme angular positions, in the first of which extreme positions said arms extend downwardly from their pivotal connections with said side bars and in the other of which positions said arms extend upwardly from said connections, the other end of at least one of said arms extending beyond the side bar opposite that to which it is pivoted in all positions, means on said other of said ends for attachment to a window or the like, a linear motor disposed wholly between said side bars, a driving connection between said motor and said arms, and means pivotally mounting said motor within said frame.

9. In a window or the like regulating mechanism, a substantially U-shaped frame comprising a pair of upstanding side bars and a cross bar connecting the lower ends thereof, said cross bar being rigidly affixed to one of said side bars, the other of said side bars being pivoted to said cross bar whereby to swing toward and away from said one side bar, a pair of arms, pivot means connecting correspoding ends of said arms and the upper portions of said side bars, said arms being pivoted to one another and being reversible between two extreme angular positions, in the first of wh.ch extreme positions said arms extend downwardly from their pivotal connections with said side bars and in the other of which positions said arms extend upwardly from said connections, the other end of at least one of said arms extending beyond the side bar opposite that to which it is pivoted in all positions, a linear motor disposed within said frame and operatively connected for actuating said cross arms, means movably mounting said motor in said frame for movement toward and away from said cross arms, and yieldable means for resisting movement of said motor and cross arms in one direction.

JOHN B. PARSONS.